United States Patent [19]

Cloutier et al.

[11] Patent Number: 6,018,397
[45] Date of Patent: Jan. 25, 2000

[54] DIGITAL IMAGE PROCESSING WITH INDICATION TO USER OF HARDCOPY OUTPUT IMAGE QUALITY

[75] Inventors: Robert P. Cloutier, Spencerport; Richard B. Wheeler, Webster, both of N.Y.

[73] Assignee: Eastman Kodak Company, Rochester, N.Y.

[21] Appl. No.: 09/023,950

[22] Filed: Feb. 13, 1998

[51] Int. Cl.[7] .............................. B41B 15/00; B41J 15/00; G06F 15/00; H04N 1/00
[52] U.S. Cl. .............................. 358/1.1; 358/401; 358/1.2; 358/1.14
[58] Field of Search ........................... 358/1.1, 1.2, 1.14, 358/114, 401, 449, 451

[56] References Cited

U.S. PATENT DOCUMENTS

| | | | |
|---|---|---|---|
| 4,682,243 | 7/1987 | Hatayama | 358/451 |
| 4,888,612 | 12/1989 | Yamamoto | 355/35 |
| 4,959,683 | 9/1990 | Otake et al. | 355/40 |
| 4,977,521 | 12/1990 | Kaplan | 358/522 |
| 4,989,077 | 1/1991 | Yamamoto | 358/506 |
| 5,511,137 | 4/1996 | Okada | 358/451 |
| 5,546,196 | 8/1996 | Huot et al. | 358/527 |
| 5,619,738 | 4/1997 | Petruchik et al. | 396/311 |
| 5,627,016 | 5/1997 | Manico | 430/434 |
| 5,751,923 | 5/1998 | Matsuzawa | 395/114 |

*Primary Examiner*—Kim Yen Vu
*Assistant Examiner*—Kimberly A. Williams
*Attorney, Agent, or Firm*—Francis H. Boos, Jr.

[57] ABSTRACT

A digital image processor that establishes a boundary level of acceptable hardcopy print quality level based on selected image print size and printing magnification and provides a warning to the user prior to generation of the hardcopy print that alerts the user when the determined print image quality will be unsatisfactory.

2 Claims, 3 Drawing Sheets

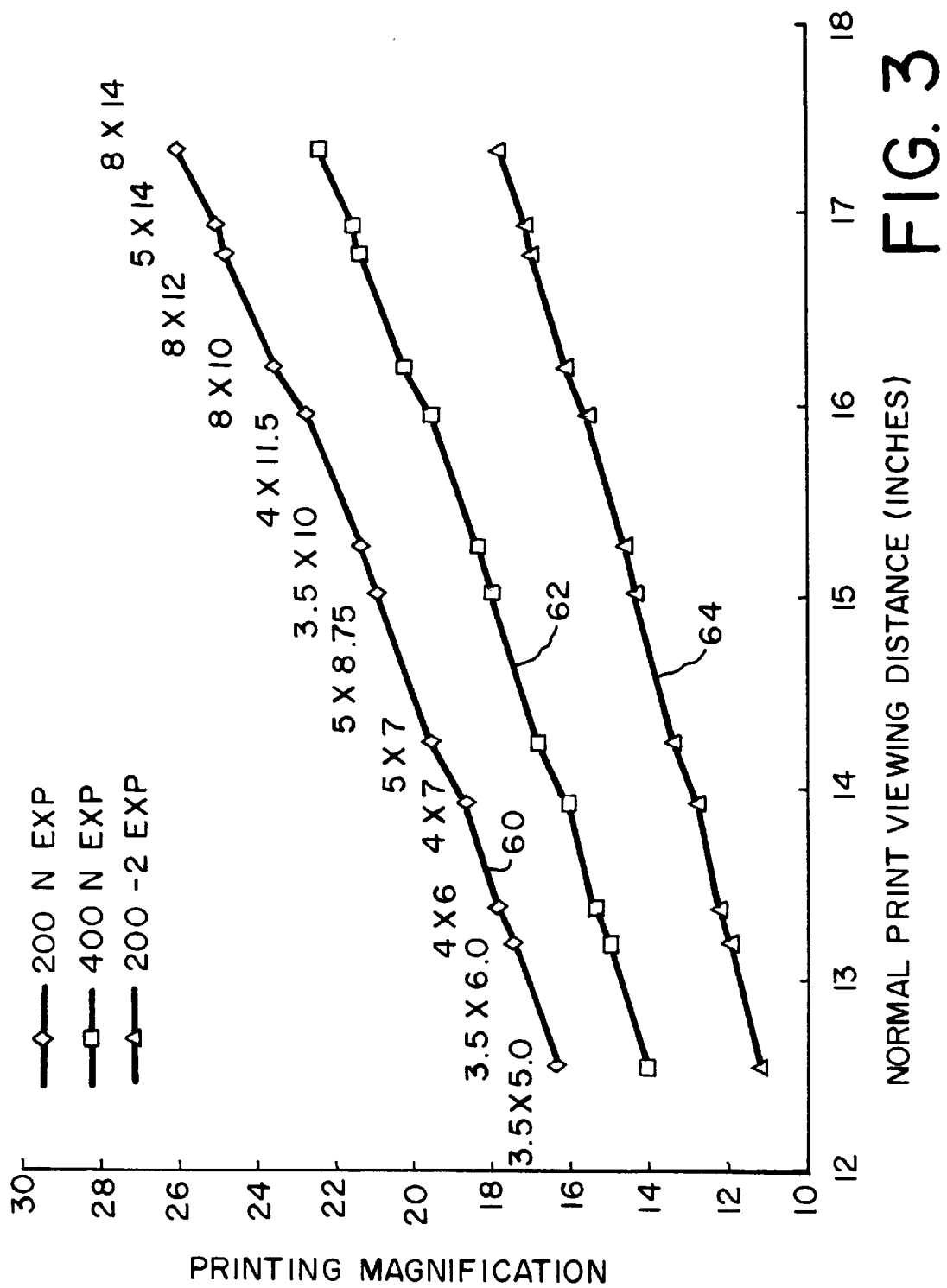

DIGITAL IMAGE PROCESSING WITH INDICATION TO USER OF HARDCOPY OUTPUT IMAGE QUALITY

FIELD OF THE INVENTION

The invention relates generally to the field of digital image processing. More specifically it relates to processing of digital information output from photographic film scanners in a manner that provides a user the ability to select image processing parameters that will assure reliable hardcopy output image quality.

BACKGROUND OF THE INVENTION

The use of film scanners that convert photographic film images into digital image files that can be manipulated and processed using computer software such as Adobe Photoshop is well known. Such systems facilitate the user's selection of desired zoom, crop and magnification parameters to be employed in converting the original film image or resulting digital image file into a hardcopy print by means of an appropriate printer, such as an optical printer, or digital printer such as inkjet or thermal dye printer or other digital printer system. Initially, such systems would be found at commercial establishments where qualified personnel would be available to advise and assist the customer in selecting appropriate print parameters. With the growing availability of personal film scanners and low cost digital color printers, such operations are increasingly being performed in the home on personal computers by users who have minimal familiarity with image processing and reproduction technology.

Existing photo manipulation software, exemplified by the Adobe Photoshop program allows users to alter characteristics of an image and display it in modified form on a computer monitor/video display. The displayed image quality will be dependent on the resolution of the scanner used to capture the image as well as the resolution of the display monitor. The image thus displayed is not necessarily intended to represent the final image quality which would result if for example a film origination material were to be reproduced on a hardcopy reproduction device. It is well known that digital image files containing sufficient information to provide high quality video display often produce low quality hardcopy images. Unfortunately for untrained users of image processing software, it is generally not apparent to the user what selection of image processing parameters, such as zoom, crop or image magnification will cause the resultant hardcopy output image quality to be degraded to the point at which the reproduced image is considered unsatisfactory; at least not until the hardcopy is produced, at which time the media is wasted. Nor does the unsatisfactory appearance of the hardcopy output image give any indication to the user that alternative image parameter settings can produce satisfactory hardcopy output images or what setting would give the desired result.

SUMMARY OF THE INVENTION

It is therefore an object of the invention to provide a method and apparatus that will give a user of digital image processing hardware an indication that will allow the user to select desired image parameter settings that will result in hardcopy output image of a satisfactory image quality.

In accordance with the invention, therefore, there is provided digital image processing apparatus for providing to a user an assessment of hardcopy output image quality comprising: first input means for providing digital image data representative of an image to be reproduced in hardcopy at a user-selected size; second input means for providing information representative of output image reproduction characteristics of a hardcopy output image reproduction device; and third input means for providing information representative of intended output image parameters, including image magnification and size. The apparatus also includes processing means responsive to said first, second and third information for determination of when a hardcopy output image generated from said information would result in an unsatisfactory level of image quality; and finally includes means responsive to said determination by the processing means for indicating to the user prior to generation of the hardcopy output image that an unsatisfactory level of hardcopy output image quality will result.

In accordance with another aspect of the invention, a method for processing digital image data and providing to a user an assessment of quality of a hardcopy output image to be generated from the digital data wherein the method comprises determining from parameters related to the input image and from data representative of a hardcopy reproduction device when an image produced on said device would present an unsatisfactory level of image quality and providing, in response to this determination, to the user prior to generation of the hardcopy output image an indication that an unsatisfactory level of hardcopy output image quality will result.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 3 is a chart illustrating the relationship between print magnification and normal print viewing distance which is useful in understanding the principals of the present invention.

DETAILED DESCRIPTION OF THE INVENTION

Figure 1:
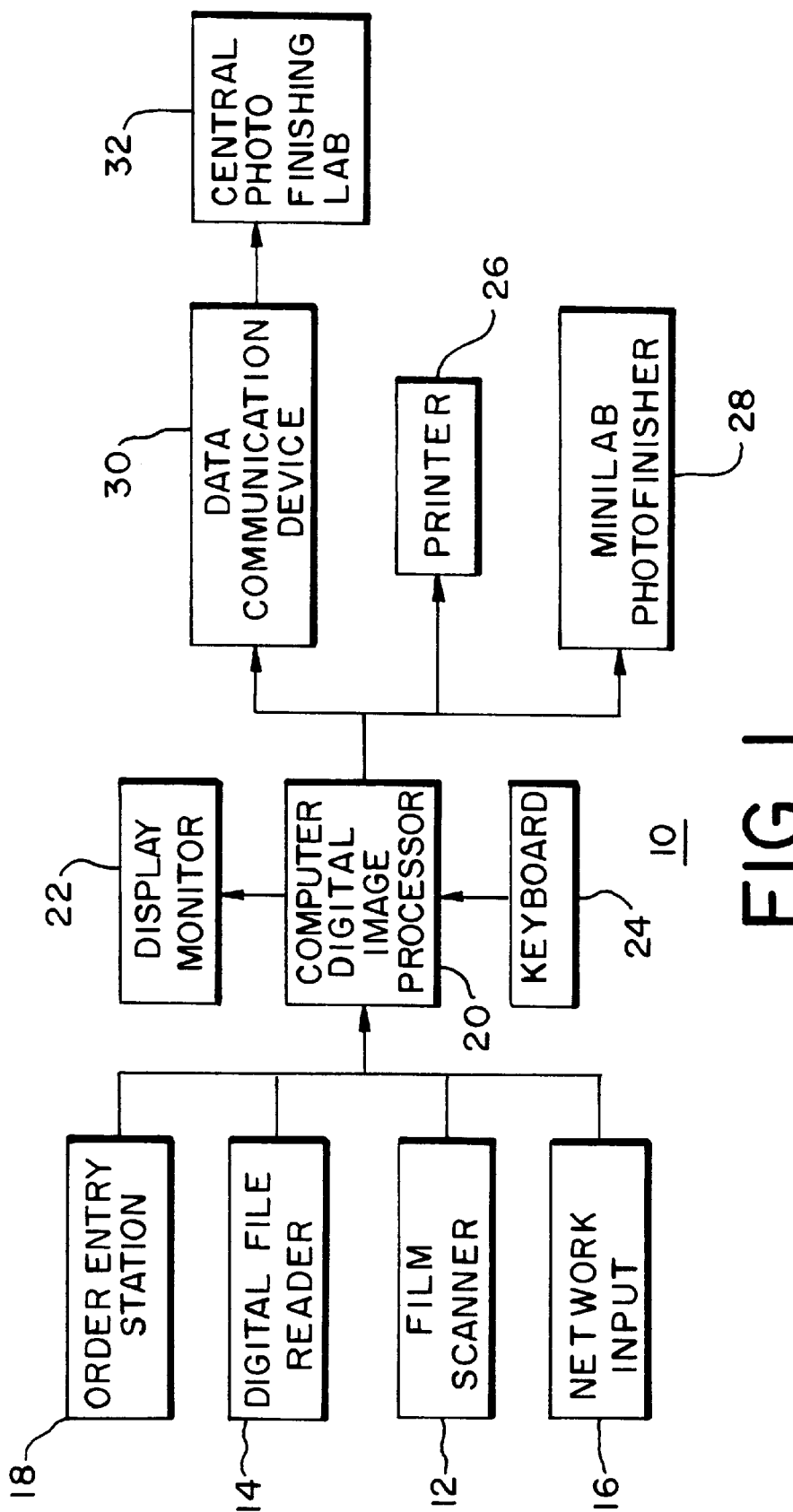
FIG. 1 is a block diagram of digital image processing apparatus according to the invention.

In FIG. 1, digital image processing apparatus 10 useful in the practice of the invention is shown in which input image data and related image parameters are provided by means of one of a variety of indicated devices. The illustrated input devices include a photographic film scanner 12 which optically scans the image frames on the film strip and converts the scanned signals into digital image data. If the scanner is capable of reading Advanced Photographic System (APS) film, then the scanner may also provide film related output data based on the APS information exchange (IX) and manufacturer data recorded on the film. Such data may include film type and intended print aspect ratio and other data fields provided by the APS system. Other possible input devices include a digital file reader 14 which may contain data from a variety of sources, including digital cameras or a picture disk reader, a network input (e.g. modem) 16 which receives digital file data from a remote, central source, as in the case of Kodak Picture Network, or an order entry station input device 18 located at a retail store which scans a customer's film and accepts order instructions, including print aspect ratio, size, zoom, crop and magnification instructions. This data is then input to an image processing computer 20 which may also include a display monitor 22 and a user data input device such as keyboard 24. In the case of a home-based personal computer, for example, the keyboard may be used to input some of the film related data and the user instruction data mentioned above. Included in the image processing functions of computer 20, in accordance with the invention, is a hardcopy output image quality assessment tool, as will be discussed in more detail below.

The output of the image processing computer 20 is applied to an appropriate output path for generation of hardcopy images. Representative output paths are illustrated and include a printer 26, such as a thermal dye printer or inkjet printer which are exemplary of printers useful for home computer use. Alternatively, the output path may comprise retail minilab photofinisher equipment 28, such as a Noritsu QSS-23 Series printer. Yet another exemplary output path comprises data communicating device (modem) 30 which communicates with, for example, a remote commercial photofinishing laboratory 32 using a CRT or other photographic printer.

Figure 2:
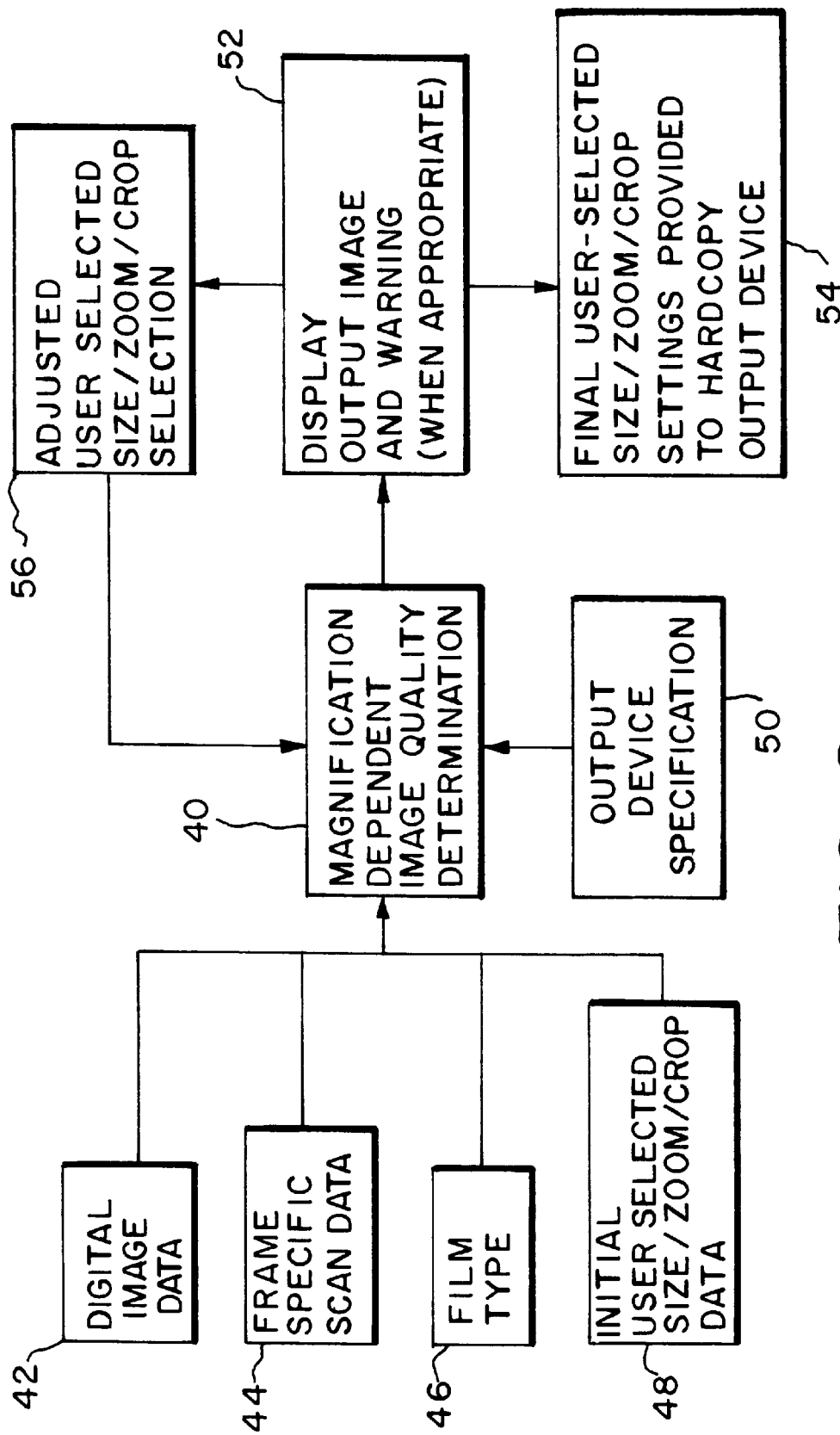
FIG. 2 is a functional block diagram illustrating the principals of operation of the present invention.

In FIG. 2, there is shown a functional block diagram illustrating the principals of the invention in which the data inputted to the magnification dependent image quality determination module 40 includes the basic digital image file data 42. Additional data inputs may optionally include frame specific scan data 44, film type information 46, and initial user selected size/zoom/crop data 48. Assuming the particular system is capable of performing with a variety of hardcopy output reproduction devices, additional input would comprise output device designation or specification data 50. The magnification dependent image quality determination function of block 40 operates for any given film with the frame specific input and the designated (user-selected) magnification (zoom) criteria and provides at block 52 an output which represents the assessment of the level of image quality that would be reproduced by a given output device. This indication is then used to control a display viewed by the user. If the print size and aspect ratio for a given magnification selection will result in a suitable hardcopy image quality, the process proceeds to block 54 which allows the desired hardcopy image print to be generated. On the other hand, if the input print size and magnification combination would result in an unsatisfactory print quality, an indication is given to the user in the display to indicate that this combination will result in an unsatisfactory level of hardcopy output image quality. This indication can take a variety of forms. For example, the indication can take the form of text on the display that warns of unsatisfactory quality and/or an audible alarm (e.g. chime sound) that alerts the user that the hardcopy output image is likely to be unsatisfactory to the user. The user is then given the option in block 56 to adjust the print size and/or magnification settings to achieve a satisfactory quality level in the resultant hardcopy print. Alternatively, the system may provide an override to allow the print to be made, if the user so desires. In an extreme situation, in which the image quality would be so poor that the user would almost certainly refuse to accept the resultant hardcopies, the system could lock out the order and prohibit the printing of the images. This option might be particularly useful in the case of a retail order entry station.

The manner in which the process determines the level of unsatisfactory print image quality to provide the appropriate warning to the user will now be described. Referring to FIG. 3, there is shown a graph illustrating the relationship between normal print viewing distance and the maximum printing magnification that will produce acceptable print quality. Every point on each of the graph lines represents a magnification and associated print size that produces equal image quality. The lines shown on the graph depict an image quality level representing the transition between acceptable and unacceptable quality for hardcopy output. Each line represents data for a specific film format, film speed and film frame exposure level. Consequently, at magnifications below a given line, no print quality warning need be issued. At magnifications above a print quality line, warnings would be issued. This quality threshold was established by empirical tests in which human observers judged the acceptability of hardcopy images at a variety of print size and print magnification conditions. For each print size, the study established the maximum magnification where acceptable print quality would be produced on an optically generated photographic print. The same method can be used to establish the maximum acceptable printing magnification for any hardcopy writing device whether optical or digital. By plotting the maximum acceptable magnification versus the normal print viewing distance for each print size, a linear relationship is produced. The use of print viewing distance based on print size yields a perceptually uniform quality relationship which simplifies the calculation of maximum acceptable magnification for other film formats, film types, frame-specific film exposure levels and output writer device characteristics. The print viewing distance relationship employed herein is fully detailed in commonly assigned U.S. Pat. No. 5,323,204 in columns 43–44. To calculate the maximum acceptable printing magnification for a new film format, new film or new exposure condition, or new output writer, a demonstration print need only be evaluated by human observers at one print size. Once the maximum acceptable printing magnification for this specific print size is established, the maximum acceptable printing magnifications for all other print sizes can be calculated by applying a scalar offset based on the single print size as just determined. This simplification is made possible by the fact that the relationship between print viewing distance and maximum acceptable printing magnification has been found to be linear. The examples shown in FIG. 3 include: "200 N exp" which represents the image quality warning boundary (line 60) for normally exposed ISO 200 color negative film in the APS format; "400 N exp" represents the image quality warning boundary (line 62) for normally exposed ISO 400 color negative film in the APS format; and "200 –2 exp" which represents the image quality warning boundary (line 60) for two stop underexposed ISO 200 color negative film in the APS format.

The invention has been described in detail with particular reference to certain preferred embodiments thereof, but it will be understood that variations and modifications can be effected within the spirit and scope of the invention. For example, the warning threshold was established based on average responses from a number of observers. It would be possible to establish user-specific print quality warning thresholds and calculate maximum allowable printing magnifications for those individual user preferences.

What is claimed is:

1. Digital image processing apparatus for providing to a user an assessment of hardcopy output image quality comprising:

first input means for providing digital image data representative of an image to be reproduced in hardcopy at a user-selected size;

second input means for providing image quality information relating to a hardcopy output image reproduction device, said image quality information being representative of acceptable and unacceptable levels of hardcopy image quality produced with said hardcopy output image reproduction device for different hardcopy image sizes at different levels of image magnification;

third input means for providing information representative of intended output image parameters, including user-selected image magnification and said user-selected size;

processing means responsive to said first, second and third information for determination of when a hardcopy output image generated from said information would result in an unacceptable level of image quality; and means responsive to said determination by the processing means for indicating to the user prior to generation of the hardcopy output image that an unacceptable level of hardcopy output image quality will result.

2. A method for processing digital image data and providing to a user an assessment of quality of a hardcopy output image to be generated from the digital data, the method comprising:

inputting, to a digital image processor, parameters pertaining to a digital image to be reproduced as a hardcopy output image by a hardcopy output image reproduction device, said parameters including image magnification;

providing, in said digital image processor, image quality information representative of acceptable and unacceptable levels of hardcopy image quality produced with said hardcopy output image reproduction device for different hardcopy image sizes at different levels of image magnification;

determining, in said digital image processor, from said inputted parameters and said image quality information when an image produced on said device would present an unacceptable level of image quality; and providing, in response to this determination, to the user prior to generation of the hardcopy output image an indication that an unacceptable level of hardcopy output image quality will result.

* * * * *